Jan. 13, 1925.  1,522,882

J. H. HAMMOND, JR

METHOD OF AND SYSTEM FOR SELECTIVE ENERGY TRANSMISSION

Original Filed March 16, 1912

WITNESSES

INVENTOR
John Hays Hammond Jr
BY
ATTORNEYS

Patented Jan. 13, 1925.

1,522,882

UNITED STATES PATENT OFFICE.

JOHN HAYS HAMMOND, JR., OF GLOUCESTER, MASSACHUSETTS.

METHOD OF AND SYSTEM FOR SELECTIVE ENERGY TRANSMISSION.

Application filed March 16, 1912, Serial No. 684,309. Renewed November 23, 1921. Serial No. 517,378.

*To all whom it may concern:*

Be it known that I, JOHN HAYS HAMMOND, Jr., a citizen of the United States, residing at Gloucester, in the State of Massachusetts, have invented certain new and useful Improvements in Methods of and Systems for Selective Energy Transmission, of which the following is a specification.

My invention relates to improvements in methods of and systems for the transmission of energy, and more particularly to a method of and system for utilizing the phenomena of interference of either the wave frequencies or group frequencies of electric waves to produce beats or increased intensity at intervals determined by the relation that the several frequencies bear to each other.

One of the objects of the invention is to provide a method of energy transmission which shall be selective and non-interferable. Various other objects of the invention will be more fully set forth in the following description of certain forms of apparatus embodying the invention as applied to the transmission of energy without wires, although the invention is not limited in its scope to the particular form of apparatus shown.

Figure 1:
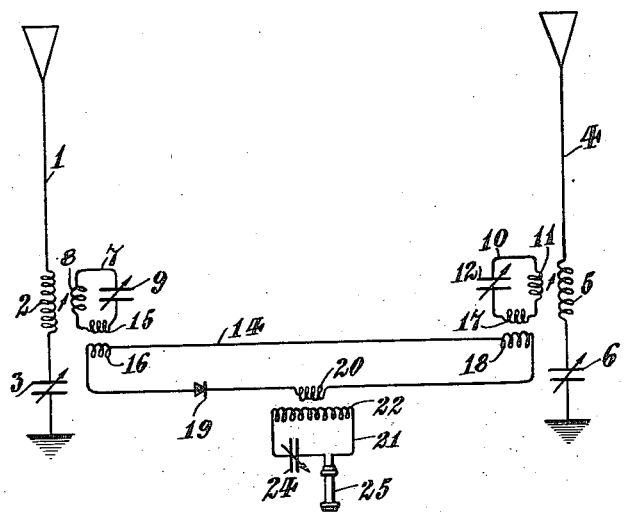
Figure 1 represents diagrammatically one form of apparatus embodying my invention and adapted to receive ether-waves of different wave frequencies.

Referring to the accompanying drawings and particularly to Figure 1 thereof, the antenna circuit 1 is tuned by means of the self-inductance 2 and condenser 3 to a predetermined periodicity, and the antenna circuit 4 is tuned by means of the self-inductance 5 and the condenser 6 to a different, predetermined periodicity.

A closed, oscillatory circuit 7 which comprises a self-inductance 8 and a variable condenser 9 is inductively coupled to the circuit 1, and a corresponding, closed circuit 10 which comprises a self-inductance 11 and variable condenser 12 is inductively coupled to the circuit 4. The circuits 7 and 10 are also inductively coupled to a common beat circuit 14 by means of coupling coils 15, 16 and 17, 18 respectively.

A rectifier 19 is inserted in the circuit 14 so as to permit flow of current in one direction and to prevent flow of current in the other direction. A coupling coil 20 is also inserted in the beat circuit 14. In the use of this arrangement, the current in the coil 20 pulsates at a frequency equal to the beat frequency.

An oscillatory circuit 21 is coupled to the beat circuit 14 by the coils 20 and 22 and is tuned to the beat frequency by means of adjustment thereof and capacity 24. Said circuit may also be provided with a suitable current indicator such as, for instance, a telephone receiver 25.

In operation, it may be assumed that the circuit 7 is tuned to a periodicity of 100,000 oscillations per second and the circuit 10 is tuned to a periodicity of 105,000 oscillations per second. Then upon reception of waves of the above-mentioned periodicities, beat currents of a frequency of 5,000 cycles per second are produced in the circuit 14. Consequently, if the circuit 21 is tuned to a frequency of 5,000 cycles per second, it will respond to the beat frequency of the circuit 14.

As is well known in the art, a telephone receiver will respond to each audio frequency impulse which passes through it. Accordingly, in the use of the arrangement shown in Fig. 1, the indicator 25, since it has the form of a telephone receiver, not only gives an indication of the passage of current through it, but emits a note which varies with the frequency of the actuating impulses. Therefore, if in the use of the arrangement shown very powerful waves are impressed upon the antennæ 1 and 4 having frequencies such as to set up beat frequency current of a frequency of, for example, 4,500 cycles per second, instead of a frequency of 5,000 cycles per second, in the oscillatory circuit 21, the operator could readily distinguish between the desired signals and the interfering waves by the difference in the note produced by them in the telephone receiver. It must be understood, however, that since the indicator circuit 21, in the case assumed, is tuned to a beat frequency current of 5,000 cycles per second, waves of frequencies such as to cause a beat frequency of 4,500 cycles per second will not operate the telephone receiver 25 unless they are of very great strength, so that under normal conditions the telephone receiver 25 will not be operated except by signal waves which produce a beat frequency current of 5,000 cycles.

By reason of the provision of a telephone receiver as an indicator in the arrangement shown in Fig. 1, certain of the advantages of the invention may be attained without the use of the oscillatory circuit 21 and with the telephone receiver connected in the circuit 14, since although the omission of the oscillatory circuit 21 involves the loss of the important advantage of such circuit in selecting only beat frequency currents of the frequency to which the circuit is tuned, nevertheless, inasmuch as the telephone receiver emits a note determined by the frequency of the current passing through it, the operator can, under ordinary conditions of operation, discriminate the note of the desired signals from notes or other sounds produced by interfering currents.

Figure 2:
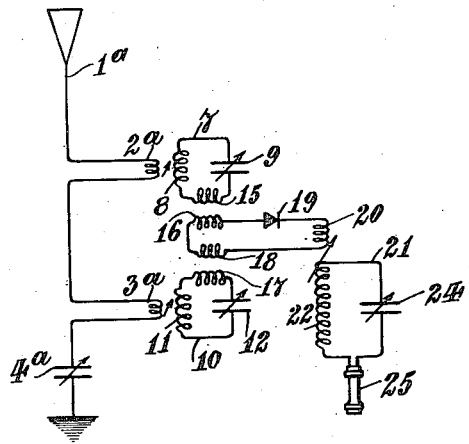
Figure 2 represents diagrammatically a modified form of apparatus adapted to receive ether-waves having predetermined, different group frequencies.

The modified form of construction shown in Figure 2 is adapted to receive transmitted energy having predetermined group frequencies. This form of the invention permits the reception of high frequency energy emitted in groups without fear of interference by forced oscillations since the receiving means is syntonized to group frequency. In this construction the antenna 1ª is in circuit with the self-inductances 2ª and 3ª and the condenser 4ª. The closed, oscillatory circuit 7 is coupled to the coil 2ª, and the circuit 10 is coupled to the coil 3ª. In this arrangement, assuming that the circuit 7 is tuned to high frequency waves emitted with a group frequency of 400 and the circuit 10 to another high frequency emitted with a group frequency of 600, then beats will be produced in circuit 14 at the rate of 200 per second. Consequently, if the circuit 21 is tuned to a frequency of 200 per second, it will respond to the beat frequency of the circuit 14.

If the circuit 21 be tuned to a certain beat frequency, this will permit the frequencies transmitted and received to be varied at will so long as the difference between said frequencies remains constant and equal to the frequency to which circuit 21 is tuned.

In the art, it is well known that in order to attain efficient tuning it is necessary to have circuits whose electrical oscillation is persistent and slowly dampened. Therefore, in all cases where I have shown detectors it may be understood that I may employ such detecting devices as present the least ohmic resistance in a circuit.

Although the particular apparatus described is adapted especially to the wireless transmission of energy, it is obvious that the invention may be advantageously employed in other modes of energy transmission. Neither is the invention limited to the transmission signals, since the received energy can be utilized for selective operation of various mechanical arrangements and devices, nor is the invention limited to the use of frequencies now commonly used in the wireless transmission of signals. It will be obvious also that various combinations can be made within the skill of the mechanic without departing from the spirit of the invention provided the means therefor in the following claims be employed.

The term "antenna circuit" appearing in certain of the appended claims is intended to signify either an antenna or a circuit coupled with an antenna so that the antenna acts as a source of energy for the circuit.

I claim for my invention:

1. A system of selective energy transmission having at the receiving station local antenna circuits responsive respectively to high frequency undamped radiant impulses of different periodicities, in combination with a circuit electrically tuned to the difference between the periodicities of said impulses.

2. A system of selective energy transmission having at the receiving station local antenna circuits responsive to high frequency impulses of different periodicities, a closed circuit to which each of said circuits is coupled, and a separate circuit coupled with said closed circuit and electrically tuned to the difference between the periodicities of said impulses.

3. A system of selective energy transmission comprising a plurality of closed oscillatory circuits tuned to predetermined periodicities, a beat circuit coupled to each of said closed circuits and comprising a rectifier, and an independent circuit coupled to said beat circuit and tuned to the beat frequency of said common circuit and comprising a current detector.

4. A system of selective energy transmission having at the receiving station local circuits responsive respectively to radiant waves of different group frequencies, in combination with a circuit electrically tuned to the specific difference of group frequencies of said waves.

5. A system for receiving radiant energy comprising two receiving devices tuned to respond to radiant impulses of different frequences respectively and a third receiving device arranged to be controlled as a result of the joint action of said first mentioned devices and tuned to respond to impulses having a frequency equal to the difference between said first mentioned frequencies.

6. A system for receiving radiant energy comprising two receiving devices arranged to respond selectively to electro radiant impulses of different frequencies respectively, a rectifier and a third receiving device arranged to be controlled as a result of the joint action of said first mentioned devices and the rectifier and tuned to respond to impulses having a frequency equal to the difference between said first mentioned frequencies.

7. A system for receiving radiant energy comprising two antenna circuits tuned to respond to radiant impulses of different frequencies respectively, a rectifier, a third circuit arranged to be controlled as a result of the joint action of said first mentioned circuits and the rectifier and tuned to respond to impulses having a frequency equal to the difference between said first mentioned frequencies, and a telephone receiver connected with said third circuit.

8. A system for receiving radiant energy comprising two receiving circuit arrangements constructed to selectively absorb from the ether and transmit electro radiant impulses of different frequencies respectively, a rectifier, a third receiving circuit arranged to be controlled as a result of the joint action of said first mentioned circuit arrangements and the rectifier and tuned to respond to impulses having a frequency equal to the difference between said first mentioned frequencies, and a telephone receiver in said third circuit.

9. A system for receiving radiant energy comprising two antenna circuits tuned to respond to radiant impulses of different frequencies respectively and a third receiving circuit arranged to be controlled as a result of the joint and simultaneous action of said first mentioned circuits and tuned to respond to impulses having a frequency equal to the difference between said first mentioned frequencies.

10. A system for receiving radiant energy comprising two antenna circuits tuned to respond to electro radiant impulses of different frequencies respectively, a rectifier, a third receiving circuit arranged to be controlled as a result of the joint and simultaneous action of said first mentioned circuits and the rectifier and tuned to respond to impulses having a frequency equal to the differences between said first mentioned frequencies, and a telephone receiver in said third circuit.

11. A system for receiving radiant energy, comprising two receiving devices constructed to selectively absorb from the ether and transmit radiant impulses of different frequencies respectively, both of said frequencies being above the frequency of sound waves which gives a maximum audibility for a given amplitude of said sound waves, and a third receiving device arranged to be controlled as a result of the joint and simultaneous action of said first mentioned devices and tuned to respond to impulses having a frequency equal to the difference between said first mentioned frequencies.

12. A system for receiving radiant energy, comprising two antenna circuits tuned to respond to radiant impulses of different frequencies respectively, both of said frequencies being substantially above audibility, a rectifier, and a third receiving circuit arranged to be controlled as a result of the joint action of said first mentioned circuits and the rectifier and tuned to respond to impulses having a frequency equal to the difference between said first mentioned frequencies.

13. A system for receiving radiant energy, comprising two antenna circuits tuned to respond to radiant impulses of different frequencies respectively, both of said frequencies being above the frequency of sound waves which gives a maximum audibility for a given amplitude of said sound waves, a rectifier, a third receiving circuit arranged to be controlled as a result of the joint and simultaneous action of said first mentioned circuits and the rectifier and tuned to respond to impulses having a frequency equal to the difference between said first mentioned frequencies, and a telephone receiver connected with said third circuit.

14. A system for receiving radiant energy, comprising two antenna circuits tuned to respond to radiant impulses of different frequencies respectively, a third circuit coupled to said first mentioned circuits, a rectifier in said third circuit, and a fourth circuit coupled to said third circuit and tuned to impulses having a frequency equal to the difference between said first mentioned frequencies.

15. A system for receiving radiant energy, comprising two antenna circuits tuned to respond to radiant impulses of different frequencies respectively, each of said frequencies being above the frequency of sound waves which gives a maximum audibility for a given amplitude of said sound waves and said frequencies differing from each other by an audio frequency, a rectifier, a third receiving circuit coupled to both of said first mentioned circuits through the rectifier and tuned to respond to impulses having a frequency equal to the audio-frequency difference between said first mentioned frequencies, and a telephone receiver connected with said third circuit.

16. A system for receiving radiant energy, comprising a plurality of antenna circuits tuned to respond to radiant impulses of different frequencies respectively, both of said frequencies being above the frequency of sound waves which gives a maximum audibility for a given amplitude of said sound waves, a rectifier circuit coupled with said antenna circuits, and a device arranged to be controlled as a result of the joint action of said circuits and tuned to respond to impulses having a frequency equal to the difference between said first-mentioned frequencies.

17. A system for receiving radiant energy, comprising a plurality of antenna circuits tuned to respond to radiant impulses of different frequencies respectively, both of said frequencies being above the frequency of sound waves which gives a maximum audibility for a given amplitude of said sound waves, and a device arranged to be controlled as a result of the joint and simultaneous action of said circuits and tuned to respond to impulses having a frequency equal to the difference between said first mentioned frequencies.

18. A transmitting system arranged for the reception of energy having the form of a plurality of specific high frequency electrical etheric oscillations of different periodicities, including a receiving station responsive only to the simultaneous reception of said specific etheric oscillations having a circuit for combining and rectifying said oscillations, and a second circuit coupled to said circuit and responsive only to said rectified combined electrical oscillations.

19. A transmitting system arranged for the reception of energy having the form of a plurality of specific high frequency electrical etheric oscillations of different periodicities, including a receiving station responsive only to the simultaneous reception of said specific etheric oscillations having a circuit for combining said oscillations, means in said circuit for rectifying the oscillations, and a second circuit inductively coupled to said circuit and responsive only to said rectified combined electrical oscillations.

20. A system for receiving radiant energy comprising a circuit, means for combining in said circuit two series of high frequency radiant impulses differing from each other in frequency by such an amount that they produce in said circuit a beat current varying in amplitude at an audio frequency, said means comprising elements for selectively absorbing each of said series of radiant impulses from the ether and transmitting it to said circuit, a rectifier in said circuit for producing direct current impulses having a frequency corresponding to the frequency of the variations in amplitude of the beat current, and a telephone receiver connected to said circuit and acting to give indications of a character dependent upon the frequency of the current in the circuit.

21. A system for receiving radiant energy comprising a circuit, means for combining in said circuit two series of high frequency radiant impulses differing from each other in a frequency characteristic by such an amount that they produce in said circuit a beat current varying in amplitude at a predetermined frequency, said means comprising elements for selectively absorbing each of said series of radiant impulses from the ether and transmitting it to said circuit, a rectifier in said first-mentioned circuit for producing direct current impulses having a frequency corresponding to the frequency of the variations in amplitude of the beat current, and a telephone receiver connected to said circuit.

22. A method of signaling which consists in transmitting energy in such a form as to include a plurality of series of periodic impulses having different frequencies respectively, receiving said energy and segregating the energy of one series of impulses from the energy of another series of impulses, combining and rectifying said segregated energies, producing electrical oscillations as a result of the action of said combined energies and indicating the presence of said last named oscillations only when the frequency thereof equals the difference between the frequencies of said segregated series of impulses.

23. A method of signalling which consists in transmitting energy through the ether in such a form as to include two series of periodic impulses having different, predetermined frequencies respectively, selectively receiving the energy of said series of impulses, combining and rectifying said received energy to produce oscillations having a frequency equal to the difference between said frequencies, and producing indications by said oscillations of a character dependent upon the frequency of the oscillations causing the indications so that indications produced by said oscillations can be distinguished from indications produced by oscillations of a different frequency.

24. A method of signalling which consists in transmitting energy through the ether in such a form as to include two series of periodic impulses having different, predetermined frequencies respectively, selectively receiving the energy of said series of impulses, combining and rectifying said received energy to produce oscillations having a frequency equal to the difference between said frequencies, selecting said oscillations from interfering oscillations, and producing indications by said oscillations of a character dependent upon the frequency of the oscillations causing the indications so that indications produced by said oscillations can be distinguished from indications produced by oscillations of a different frequency.

This specification signed and witnessed this 27th day of February, A. D. 1912.

JOHN HAYS HAMMOND, Jr.

Witnesses:
  ALBERT W. SIOUSSA,
  MARY C. KING.